US010978792B2

(12) United States Patent
Harleman et al.

(10) Patent No.: US 10,978,792 B2
(45) Date of Patent: Apr. 13, 2021

(54) THERMAL GROWTH MANAGEMENT OF RADOME BY BOUNDARY CONSTRAINTS

(71) Applicant: THE BOEING COMPANY, Chicago, IL (US)

(72) Inventors: Thomas J. Harleman, Maple Valley, WA (US); David E. Sanford, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 724 days.

(21) Appl. No.: 15/730,082

(22) Filed: Oct. 11, 2017

(65) Prior Publication Data

US 2019/0109369 A1    Apr. 11, 2019

(51) Int. Cl.
*B64C 1/36* (2006.01)
*H01Q 1/28* (2006.01)
*H01Q 1/42* (2006.01)
*F16B 5/02* (2006.01)
*H01Q 1/02* (2006.01)

(52) U.S. Cl.
CPC .................. *H01Q 1/28* (2013.01); *B64C 1/36* (2013.01); *F16B 5/0241* (2013.01); *H01Q 1/282* (2013.01);
(Continued)

(58) Field of Classification Search
CPC ........................................................ B64C 1/36
See application file for complete search history.

(56) References Cited

U.S. PATENT DOCUMENTS 4,509,709 A * 4/1985 Utton ........................ B64C 1/36
                                                      244/118.1
2008/0178465 A1* 7/2008 Schiavo ................ F01D 25/246
                                                      29/889.21
(Continued)

FOREIGN PATENT DOCUMENTS

EP    1598562 A1    11/2005
EP    2551201 A2    1/2013
FR    2369967 A1 *  6/1978   ............... B64C 1/36

OTHER PUBLICATIONS

U.S. Appl. No. 14/838,964 entitled "Sliding Radome With Support Structure", filed Aug. 28, 2015.
(Continued)

*Primary Examiner* — Philip J Bonzell
*Assistant Examiner* — Tye William Abell
(74) *Attorney, Agent, or Firm* — Marshall, Gerstein & Borun LLP (57) ABSTRACT

A radome assembly of an aircraft includes a shell having an elongated shape wherein the shell defines a first opening having a diameter of a first dimension and is positioned within a first end portion of the shell. The shell defines a second opening having an elongated shape which extends along a length of the shell and has a second dimension which is greater than the first dimension. First fastener extends through the first opening and is engaged with a first surface associated with a first structural element and resists movement of the shell and the first structural element relative to one another. Second fastener extends through the second
(Continued)

opening and is engaged with a second surface associated with the first structural element such that the shell is moveable along the length of the shell relative to the first structural element.

20 Claims, 10 Drawing Sheets

(52) U.S. Cl.
CPC ............... *H01Q 1/42* (2013.01); *H01Q 1/427* (2013.01); *H01Q 1/02* (2013.01)

(56) References Cited

U.S. PATENT DOCUMENTS

| | | | | |
|---|---|---|---|---|
| 2013/0025219 A1* | 1/2013 | Edmond | ................ | B64D 47/06 52/204.7 |
| 2015/0101478 A1* | 4/2015 | Palmer | .................. | F41F 3/0406 89/1.82 |
| 2016/0172745 A1* | 6/2016 | Keen | ........................ | H01Q 1/50 343/705 |
| 2016/0172748 A1* | 6/2016 | Keen | ...................... | H01Q 1/422 343/872 |
| 2017/0062920 A1* | 3/2017 | Harleman | ................ | H01Q 1/28 |

OTHER PUBLICATIONS

EP Search Report for Application No. 18187999.0 dated Mar. 15, 2019, 9 pgs.
Communication Pursuant to Article 94(3) EPC for EP Application No. 18187999.0 dated Aug. 18, 2020.
Notification of First Office Action for CN Application No. 201811176398.9 dated Jan. 6, 2021.

* cited by examiner

THERMAL GROWTH MANAGEMENT OF RADOME BY BOUNDARY CONSTRAINTS

FIELD

This disclosure relates to a radome assembly which provides an aerodynamic and weatherproof enclosure for protecting a radar system carried on an aircraft and more particularly to securement of a shell of the radome assembly.

BACKGROUND

Radar systems are used in association with an aircraft in determining information such as distance, altitude, direction and/or speed of objects relative to the aircraft. The radar system is sometimes positioned underneath the fuselage of the aircraft and in a position wherein the engines of the aircraft do not block the operation of the radar system. The radar system requires protection from the weather conditions of the atmosphere within which the aircraft operates. A radome assembly includes a shell structure which defines a cavity within which at least a portion of the radar system is located and which provides cover and protection for the radar system from the weather conditions with the aircraft in operation, provides an aerodynamic shape for flight and is constructed of an electrically transparent material with respect to the radio frequency of the radar.

The shell of the radome assembly has an elongated shape and extends in a direction along a length of the aircraft. The radome assembly carries the shell from a closed position positioned beneath the aircraft fuselage in a direction along the length of the aircraft so as to access the radar equipment for maintenance. Thereafter, the radome is moved in an opposite direction along the length of the aircraft to a closed position such that the shell is in a protective covering position for the radar equipment during aircraft operation. The shell is constructed of a material which is substantially transparent to the radio waves of the radar system so as to minimally attenuate the radio waves transmitted and received by an antenna of the radar system.

With shell in and radome assembly in a closed position, the shell is affixed along a length of the shell to a structure connected to the aircraft. The affixed shell can present some unwanted problems during the operation of the aircraft. With the aircraft experiencing different atmospheric temperatures during operation of the aircraft, the material from which the shell is constructed experiences expansions and contractions based on the thermal expansion coefficient of the material. With the shell affixed in position with fasteners, the change in thermal conditions experienced by the material of the shell results in significant force loads being exerted between the shell and fasteners as a result of the material expanding and contracting in response to temperature changes. These force loads reduce the useful life of the shell and the fasteners. In addition, the force loads between the shell and the fasteners can cause a distortion in the shape of the shell which in turn causes attenuation of the radio waves being transmitted and received by the radar system.

In view of the force loads exerted between the shell and the fasteners from changes in the thermal conditions, additional fasteners could be employed to secure the shell to the structure to which the shell is connected to assist in resisting the force loads. However, the use of more fasteners will require the addition of more weight to the aircraft increasing the operation costs of the aircraft and require more labor cost to install the shell. The increase in the number of fasteners used will not prevent distortion of the shape of the shell from changes in the thermal conditions during operation of the aircraft. Employing a thicker construction to the shell to confront the force loads induced by the change in thermal conditions will also add unneeded additional weight to the aircraft and increase operational costs.

As a result, there is a need to provide a securement of the shell of the radome assembly with the shell in a closed protective position with respect to the radar system so as to reduce or eliminate the thermal induced force loads between the shell and the fasteners securing the shell during operation of the aircraft. The reduction or elimination of the force loads will increase the useful life of the fasteners and the shell and will also reduce the occurrence of distortion of the shape of the shell which can affect the optimal operation of the radar system. At the same time, there is a need not to increase the operational cost of the aircraft through the addition of weight to the radome assembly by way of an increase in the number of fasteners employed or thicker construction of the shell employed. There is a need as well not to increase installation costs with the increase in a number of fasteners used and not to increase time needed in removing and reengaging the fasteners used in accessing and maintaining the radar system.

SUMMARY

An example includes a radome assembly of an aircraft which includes a shell having an elongated shape, wherein the shell defines a first opening which extends through the shell having a diameter of a first dimension and is positioned within a first end portion of the shell. The shell defines a second opening which extends through the shell having an elongated shape which extends along a length of the shell, has a second dimension which is greater than the first dimension and is spaced apart along the length of the shell from the first opening. A first fastener extends through the first opening and is engaged with a first surface associated with a first structural element connected to the aircraft and the first fastener resists movement of the shell and the first structural element relative to one another. A second fastener extends through the second opening and is engaged with a second surface associated with the first structural element such that the shell is moveable along the length of the shell relative to the first structural element as a result of thermal induced expansion or contraction of the shell.

An example includes a radome assembly of an aircraft which includes a shell having an elongated shape, wherein a first end portion of the shell is fixedly connected to a first structural element connected to the aircraft. A second end portion of the shell opposing the first end portion of the shell is fixedly secured to a frame member which extends away from a distal end of the shell in a direction in which a length of the shell extends. A first compression angle is secured to a fixed structural element associated with the radome assembly and a second compression angle is secured to the fixed structural element. The frame member extends between the first and second compression angles. With the frame member positioned between the first and second compression angles, a slot defined between the first and second compression angles extends away from a distal end of the frame member in the direction in which the length of the shell extends and in an opposing direction to the direction permitting the frame member to travel within the slot in one of the direction with expansion of shell 24 along length L of shell 24 or in the opposing direction with contraction of the shell along the length of the shell.

The features, functions, and advantages that have been discussed can be achieved independently in various embodiments or may be combined in yet other embodiments further details of which can be seen with reference to the following description and drawings.

DESCRIPTION

Figure 1:
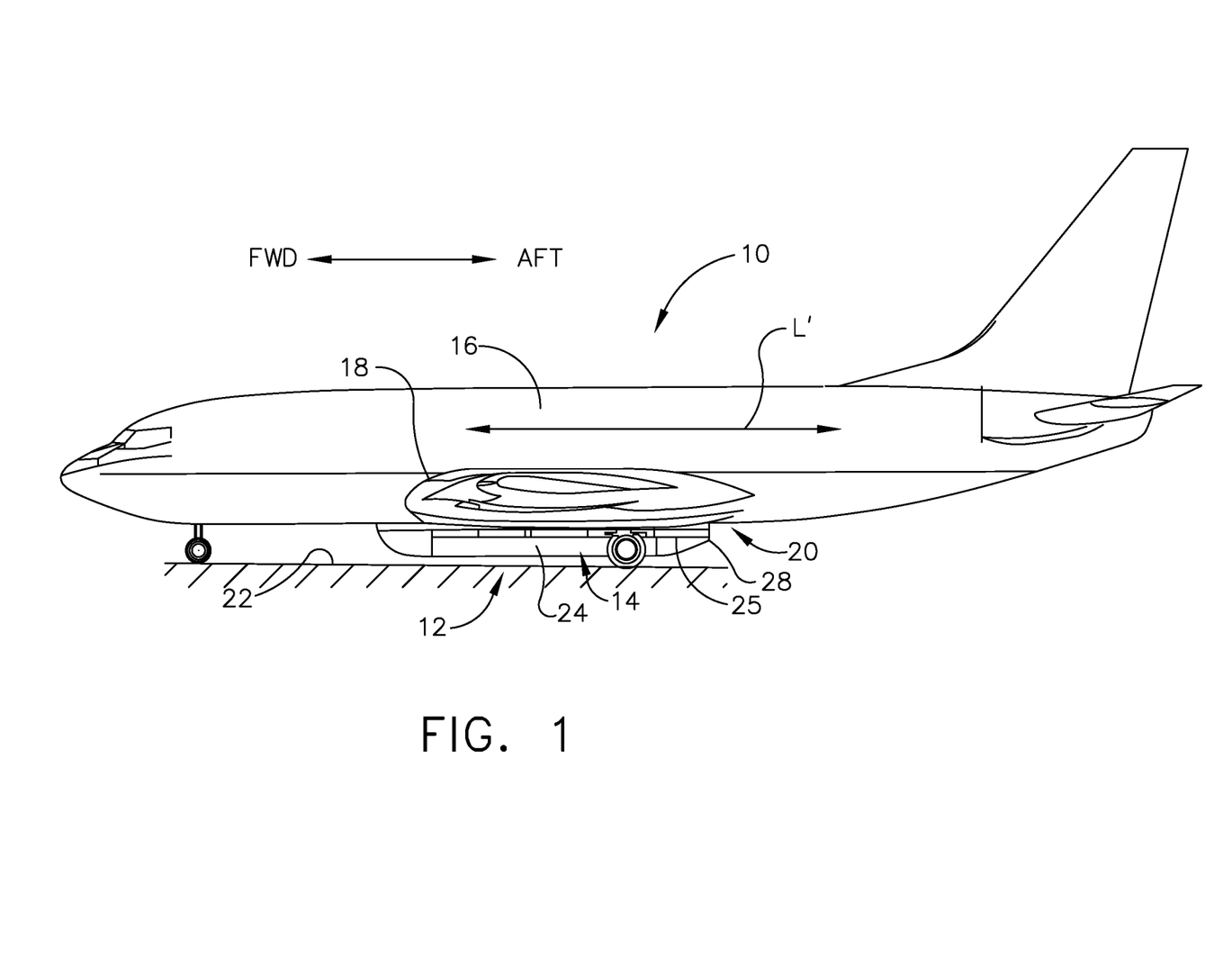
FIG. 1 is a side view of an aircraft with a radome assembly in a closed position provides protection to a radar system of the aircraft from weather conditions and provides an aerodynamic shape for aircraft flight operations.

In referring to FIG. 1, aircraft 10 has a radar system 12 coupled with aircraft 10 and a radome assembly 14 in a closed position which covers radar system 12 and protects radar system 12 from weather conditions and aerodynamic effects with aircraft 10 in operation. Aircraft 10 in this example is an airplane and in other examples the aircraft can also include a helicopter or unmanned aircraft. Aircraft 10 has fuselage 16 with wings 18 which extend laterally from fuselage 16. One or more engines may be coupled to each wing 18 to propel aircraft 10, however, in FIGS. 1 and 2 the engines have been omitted to provide a better line of site for radome assembly 14. A forward direction relative to aircraft 10 has been designated as FWD and a rearward or aft direction relative to aircraft 10 has been designated as AFT.

Radar system 12 is positioned, in this example, in a lower portion of aircraft 10 at a bottom side 20 of fuselage 16. Radar system 12 may include one or more antennas which is/are configured to transmit and receive radio waves in order, as discussed earlier, to determine parameters as range, altitude, direction and/or speed of objects positioned, in this example, below aircraft 10 while aircraft 10 is in flight. Radome assembly 14 extends in a direction, in this example, away from and below fuselage 16 in enclosing at least a part of radar system 12. In this example, radar system 12 is in a position to transmit and receive radio waves in a generally downward direction with respect to aircraft 10 without or minimal interference from the engines (not shown) mounted on wings 18.

Figure 2:
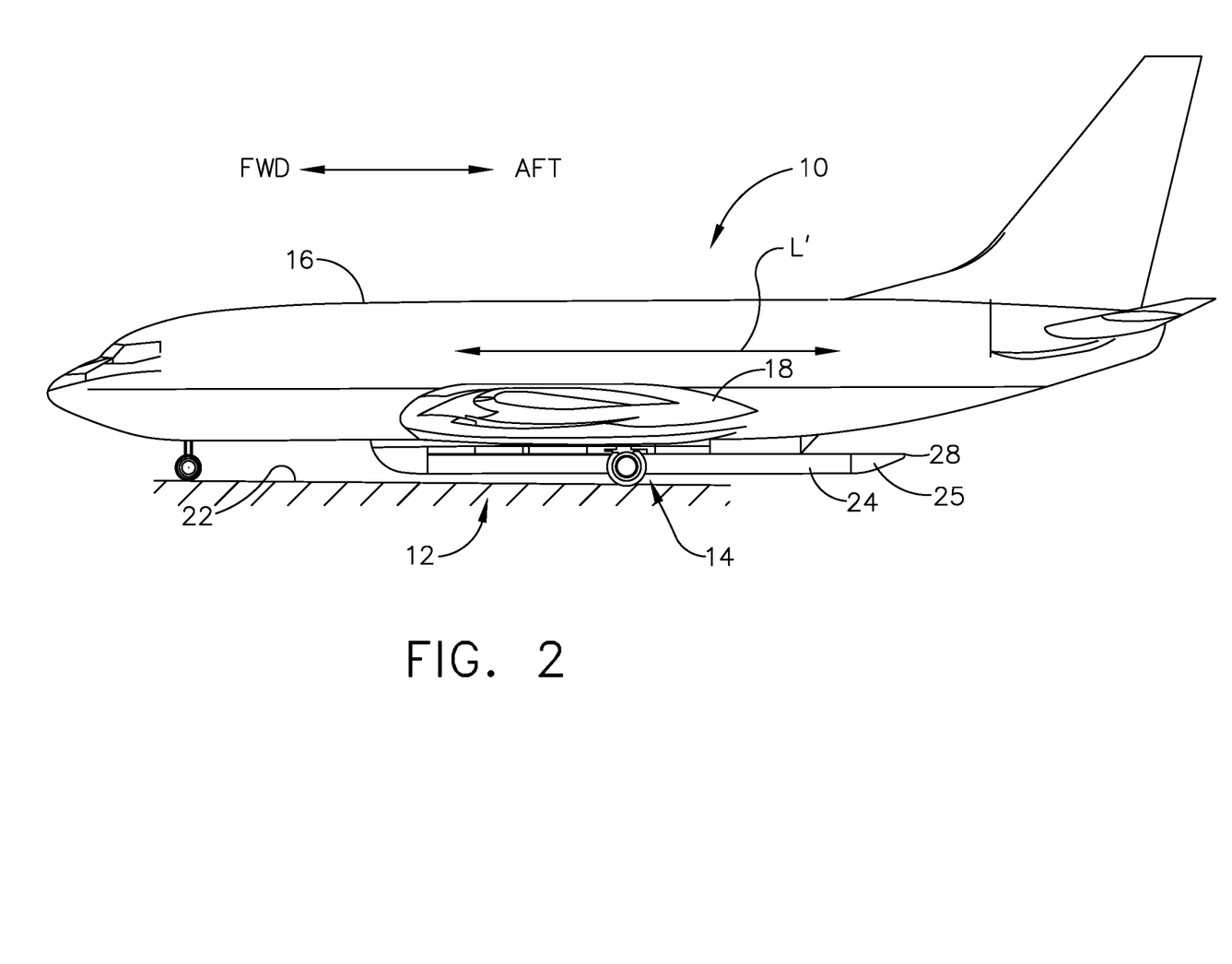
FIG. 2 is the side view of FIG. 1 showing the radome assembly in an open position.
Figure 3:
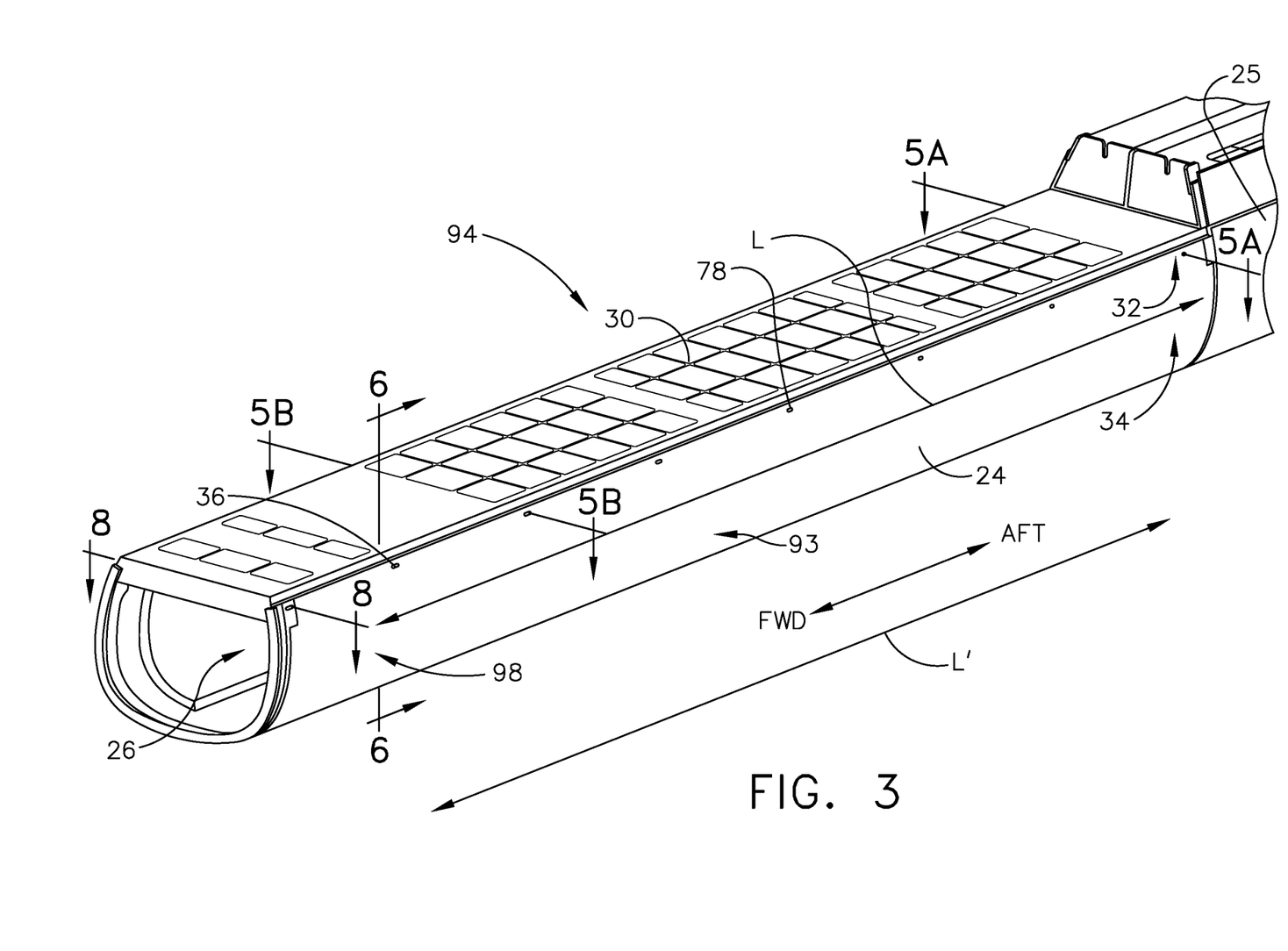
FIG. 3 is a partial perspective view of a shell of a radome assembly and a sill assembly of the aircraft structure.

With radome assembly 14 positioned extending below fuselage 16 and with aircraft 10 positioned on ground 22, radome assembly 12, in this example, is slid in the AFT direction into an open position relative to aircraft 10, as seen in FIG. 2. With radome assembly 14 in an open position, maintenance can be provided to radar system 12. When maintenance is completed, radome assembly 14 can be slid back toward the FWD direction into a closed position placing shell 24 of radome assembly 14 in a protective position overlying radar system 12 as seen in FIG. 1. Shell 24, as seen in FIG. 3, defines an internal volume 26 wherein at least a portion of radar system 12 resides therein. Shell 24 has an elongated shape which extends in length direction L which extends along in the same direction of length direction L' of aircraft 10.

In referring to FIGS. 1-3, radome assembly 14 includes shell 24 and in the aft portion of radome assembly 14 a separate structure constructed of a second shell or "canoe" shape portion 25 defines a volume (not shown) and has a closed end 28. In this example, sill assembly 30 is a support structure fixedly secured to aircraft 10. As will be discussed in more detail herein, radome assembly 14, which includes shell 24 along with canoe shape portion 25, is in slidable relationship with respect to sill assembly 30. With aircraft 10 in operation radome assembly 14 is secured in relationship to sill assembly 30 maintaining radome assembly 14 and shell 24 in closed protective position relative to radar system 12 as seen in FIG. 1.

Figure 9:
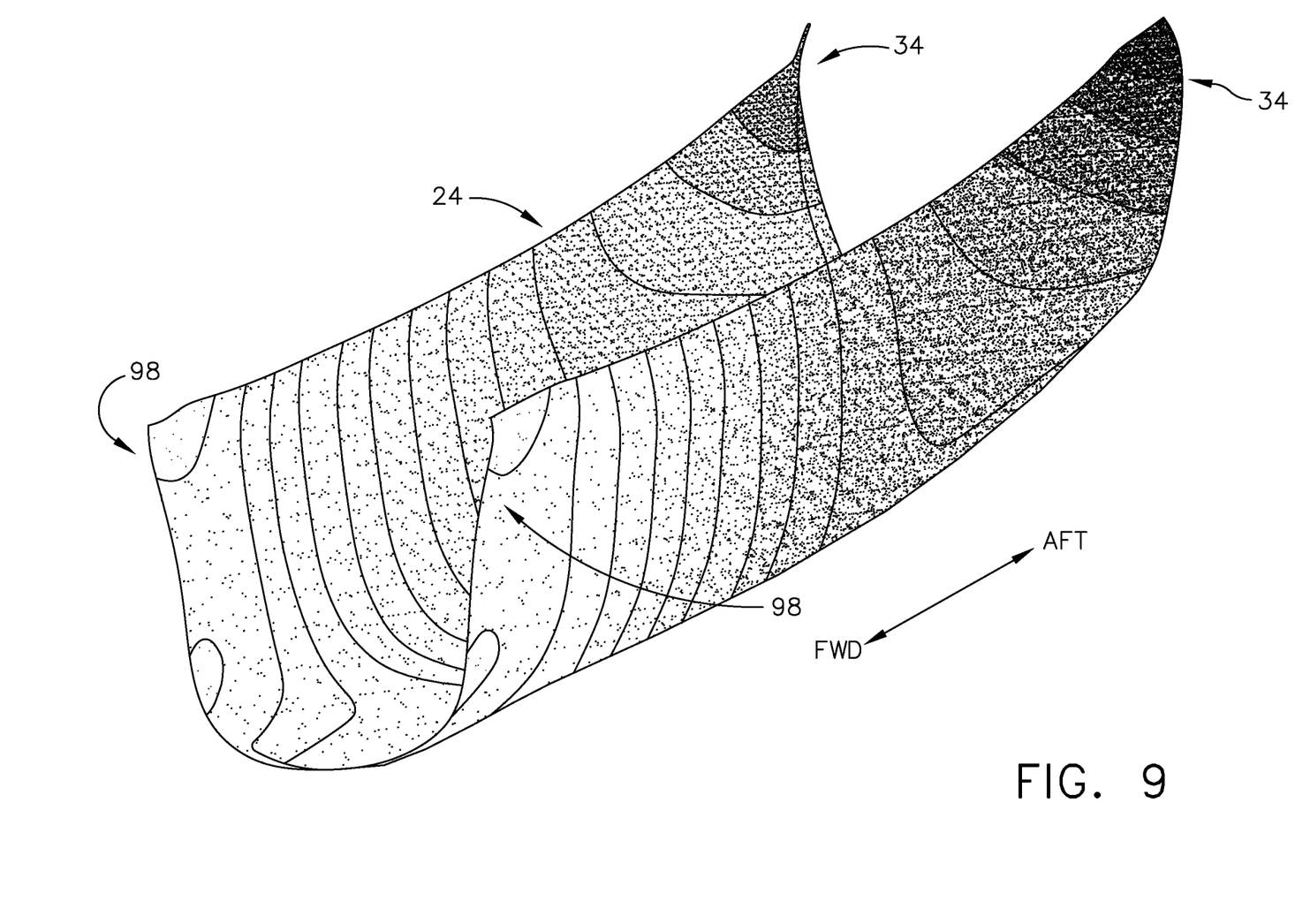
FIG. 9 is a schematic representation of a shape of a shell of a radome assembly which has been fixedly secured along the shell to a structure of the aircraft, not in accordance with the disclosure herein, resulting in distortions to the shape of the shell with a change in temperature experienced by the material of the shell with the aircraft in operation.
Figure 10:
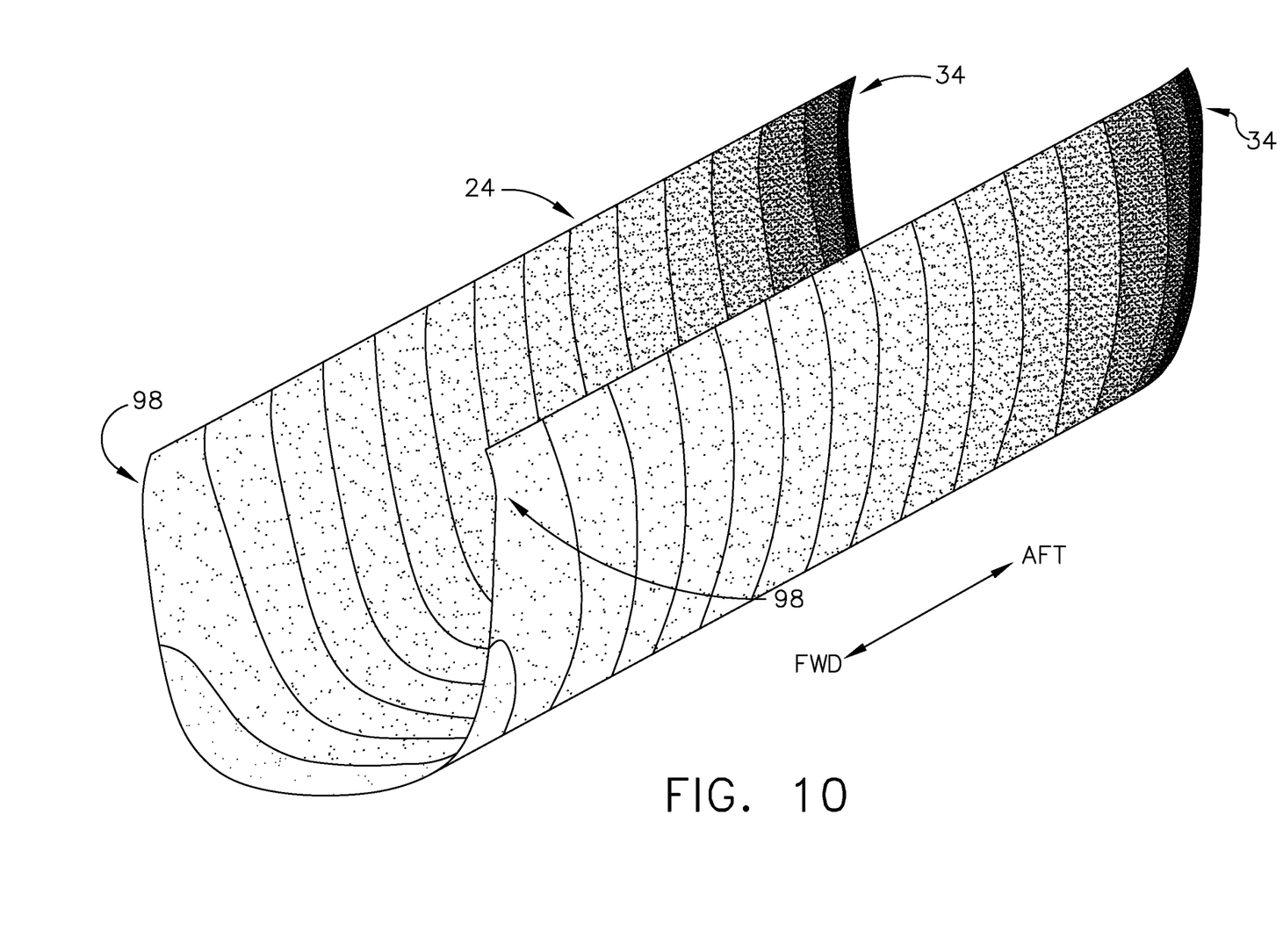
FIG. 10 is a schematic representation of the shape of the shell of the radome assembly with the shell, secured in accordance with the disclosure, herein without distortion to the shape with the aircraft in operation.

With aircraft 10 in operation, aircraft 10 is exposed to varying weather conditions and varying temperatures. As a result of these changing conditions, the material which constructs shell 24 expands or contracts in accordance with the coefficient of thermal expansion of that material. In this example, shell 24 is constructed of a composite material. As discussed earlier, securement of shell 24 in a fixed position during aircraft 10 operation will result in varying temperature conditions being experienced by the material of shell 24 and will cause large forces to develop between shell 24 and fasteners that hold shell 24 in a fixed position. The large forces will cause shell 24 to distort or deform in shape, as seen in FIG. 9, during flight operations in contrast to shell 24 maintaining a non-deformed configuration as seen in FIG. 10 which will result from the securement of shell 24 as will be discussed herein. The prevention of deformation of shell 24, as discussed earlier, will reduce attenuation of the radio waves being emitted and received by radar system 12, will result in a longer useful life of radome assembly 14 as well as reduce the cost of installation of radome assembly 14 along with the cost of operation of aircraft 10. In addition, the securement of shell 24 of radome assembly 14 discussed herein provides quicker access to radar system 12 for maintenance.

Figure 4:
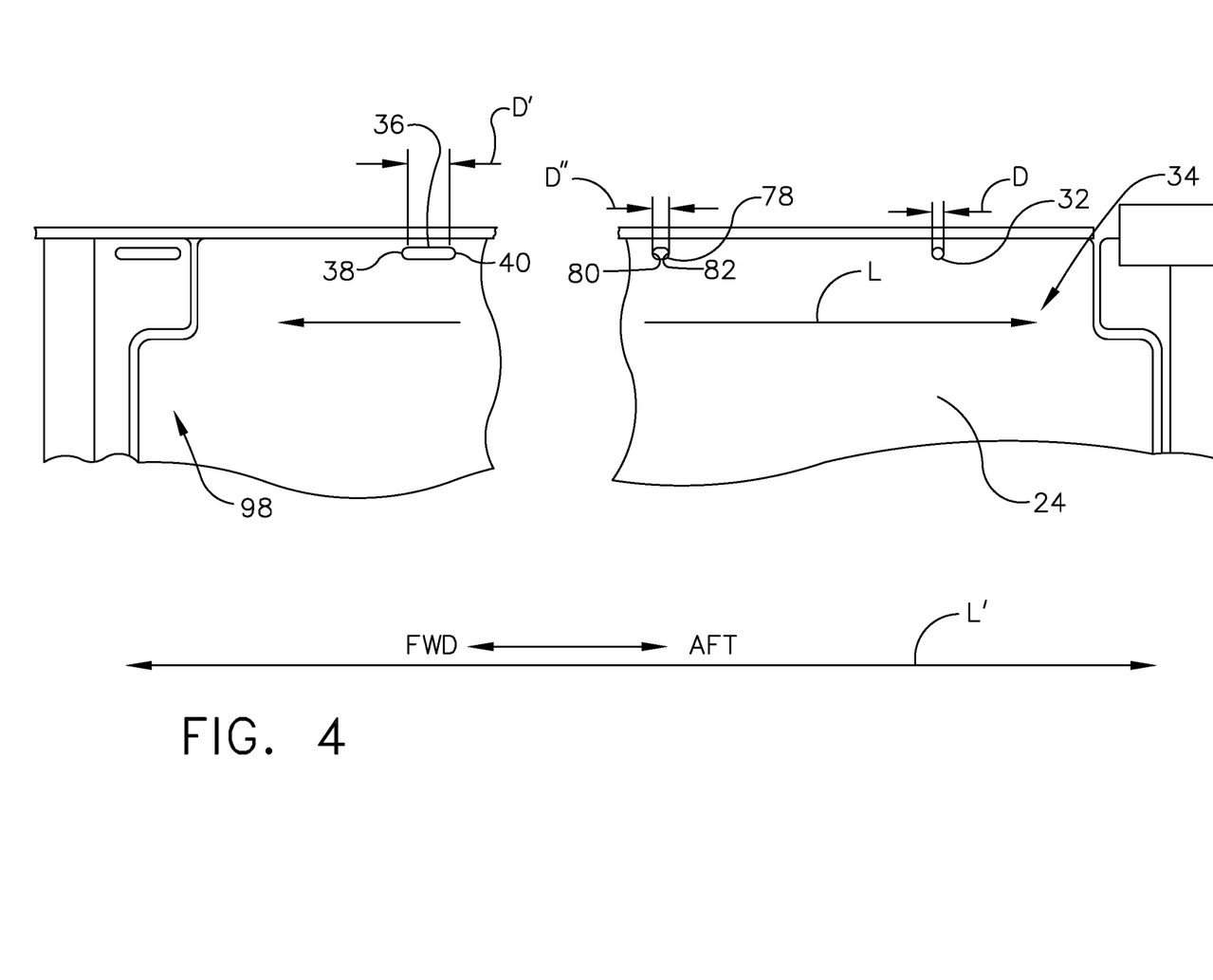
FIG. 4 is a partial broken apart enlarged side view of the shell of FIG. 3 of the radome assembly with progressively enlarged openings positioned along a length of the shell.

In referring to FIGS. 3-5b, one embodiment of securement of shell 24 is shown which will facilitate movement of shell 24 as a result of temperature induced expansion or contraction of the material of shell 24 with shell 24 secured to aircraft 10 during flight operations of aircraft 10. Shell 24 of radome 14, in this example, is constructed of composite material and has an elongated shape extending in length direction L. Shell 24 defines first opening 32 which extends through shell 24 having diameter of a first dimension D, as seen in FIG. 5a. First opening 32 is positioned within a first end portion 34 of shell 24. Shell 24 defines second opening 36 wherein second opening 36 extends through shell 24. Second opening 36 defines an elongated shape which extends along length L of shell 24 having second dimension D'. Second dimension D' is greater than first dimension D and second opening 36 is spaced apart along length L of shell 24 from the first opening 32 as seen in FIGS. 3 and 4. Shell 24 also defines a pair of internal opposing sidewall portions 38, 40 positioned within second opening 36 spaced apart from one another along length L of shell 24.

Figure 5A:
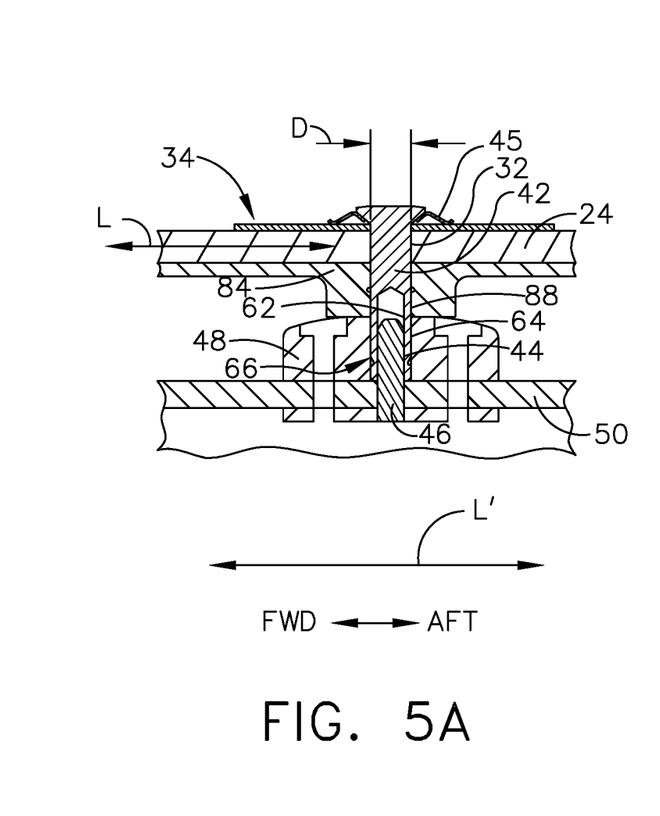
FIG. 5a is a cross section view of a fastener securing the shell of the radome assembly with a structure of the aircraft, as seen along line 5a-5a in FIG. 3 wherein the fastener extends through a first opening defined by the shell which has a diameter of a first dimension.
Figure 6:
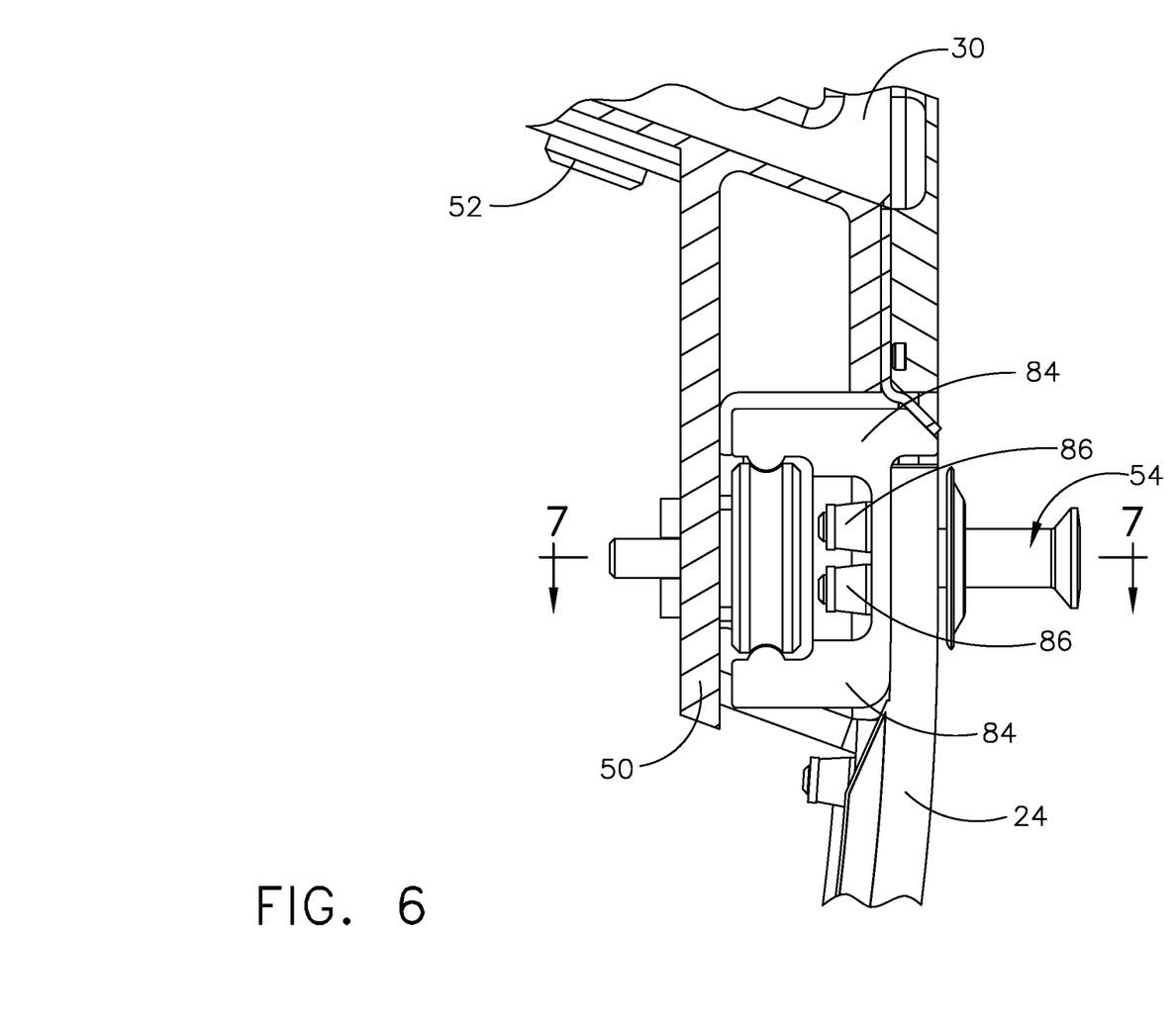
FIG. 6 is a cross section of the shell and a slide rail assembly wherein the slide rail is secured to the shell and a wheel assembly is connected to the aircraft structure as seen along line 6-6 in FIG. 3.

First fastener 42 extends through first opening 32 wherein first fastener 42 is engaged with first surface 44 associated with first structural element 50 connected to aircraft 10. Spring washer 45, in this example, is employed and positioned between first fastener 42 and shell 24 providing control of clamping force of fastener 42 as will be discussed herein. First structural element 50 can take on various configurations and include one or more components and is connected and/or secured to a structure of aircraft 10 or to a structure(s) which is connected and/or secured to a structure of aircraft 10. In this example, first surface 44, as seen in FIG. 5a, is positioned on post 46 which is a part of clamp-up block 48. Clamp-up block 48 is bolted (not shown) to first structural element 50 which in turn, as seen in FIG. 6, is secured to sill assembly 30 with fastener 52. As discussed earlier, sill assembly 30 is secured to a structure of aircraft 10 (not shown). In an alternative example (not shown), first structural element could include a single integral component, for example, which could include first structural element 50 and sill assembly 30 as a single structure. Moreover, first surface 44 in an alternative example (not shown) is positioned directly on first element 50. First structural element 50, in this example, extends along in length L of shell 24. Sufficient compressive clamp up force is applied between shell 24 and first structural element 50 with first fastener 42 engaged with first surface 44 such that first fastener 42 resists movement of shell 24 and first structural element 50 relative to one another.

Figure 5B:
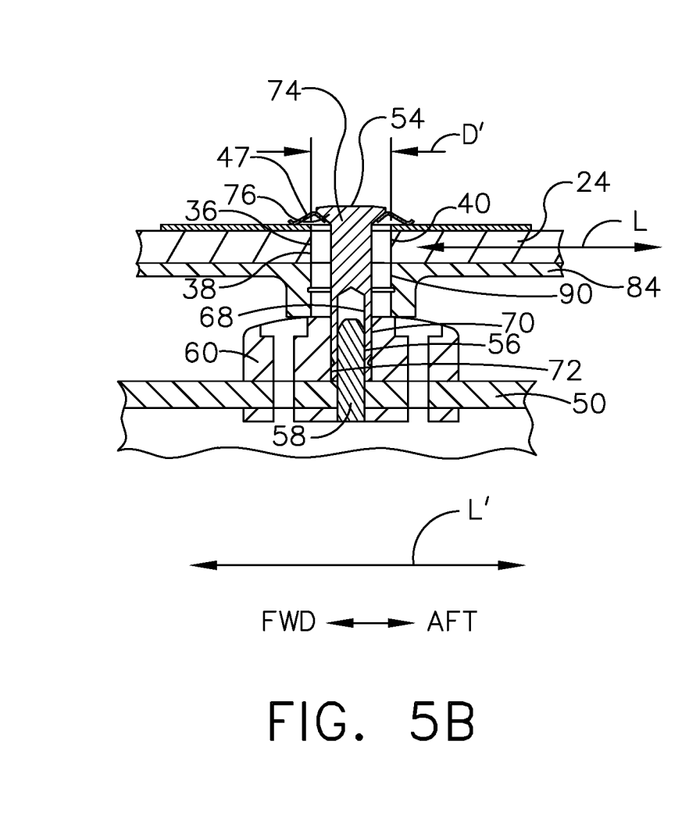
FIG. 5b is a cross section of a fastener securing the shell of the radome assembly with the structure of the aircraft, as seen along line 5b-5b in FIG. 3 wherein the fastener extends through an elongated opening defined by the shell which has a length of a second dimension.

Second fastener 54 extends through second opening 36 wherein second fastener 54 is positioned between internal opposing sidewall portions 38, 40, as seen in FIG. 5b, and is engaged with second surface 56 associated with first structural element 50, as similarly described above with respect to first fastener 42. Spring washer 47 is employed in this example between second fastener 54 and shell 24 to provide control of clamping force of fastener 54 as will be discussed herein. As mentioned above, first structural element 50 can take on various configurations and one or more components so long as first structural element is a structural component which is connected and/or secured to a structure of aircraft 10 or to a structure(s) which is secured and/or connected to a structure of aircraft 10. In this example, second surface 56, as seen in FIG. 5b, is positioned on post 58 which is a part of clamp-up block 60. Clamp-up block 60 is bolted (not shown) to first structural element 50 which in turn, as seen in FIG. 6, is secured to sill assembly 30 with fastener 52. Sill assembly 30, as discussed earlier, is secured to aircraft 10 (not shown). In an alternative example, first structural element could include a single integral component, for example, which could include first structural element 50 and sill assembly 30 as a single structure. Moreover, first surface 44 in an alternative example (not shown) could be positioned directly on first element 50. As mentioned above, first structural element 50, in this example, extends along length L of shell 24. Shell 24 as a result of the securement of second fastener 54 and positioning within second opening 36, is moveable along length L of shell 24 relative to first structural element 50 as a result of thermal induced expansion or contraction of shell 24.

First fastener 42, as seen in FIG. 5a, is engaged with first surface 44, with first surface 44 defining threads (not shown) which are configured to engage threads (not shown) defined by interior surface 62 of first fastener 42, wherein threads of first fastener 42 engage threads of first surface 44 of post 46 of clamp-up block 48. In an alternative example, threads can be defined on an external surface 64 of first fastener 42 and be configured to engage threads defined by an interior surface 66 of clamp-up block 48. In either configuration, the tightening of first fastener 42 with respect to clamp-up block 48 exerts a compressive force securing first structural element 50 to shell 24 in affixing first structural element 50 and shell 24 together and first fastener 42 resists movement of first structural element 50 and shell 24 relative to one another.

Second fastener 54, as seen in FIG. 5b, is engaged with second surface 56, with second surface 56 defining threads (not shown) which are configured to engage threads (not shown) defined by interior surface 68 of second fastener 54, wherein threads of second fastener 54 engage threads of second surface 56 of post 58 of clamp-up block 60. In an alternative example, threads can be defined on an external surface 70 of second fastener 54 and be configured to engage threads defined by an interior surface 72 of clamp-up block 60. In either configuration, the tightening of second fastener 54 with respect to clamp-up block 60 exerts a compressive force securing first structural element 50 to shell 24. The clamping force applied by second fastener 54 is controlled at second opening 36 by way of numerous methods such as tight tolerance, spring washers, such as spring washer 47, use of flexible materials as well as other known methodologies. In the instance of second fastener 54, for example, spring washer 47 provides firm securement between shell 24 and first structural element 50 and minimizes frictional forces between shell 24 and first structural element 50 to permit relative movement between shell 24 and first structural element 50. As temperature changes, the composite material of shell 24, in this example, expands or contracts at a different rate than that of first structural element 50 constructed, in this example, of aluminum.

First fastener 42 tightly secures and affixes shell 24 and first structural element 50 together and first fastener 42 resists relative movement between shell 24 and first structural element 50. Second fastener 54 has a controlled compression force applied, as discussed above, between shell 24 and first structural element 50 such that shell 24 and first structural element 50 are secured together yet movement is permitted such that shell 24 is moveable in direction along length L of shell 24 relative to first structural element 50 as a result of thermal induced expansion or contraction of shell 24. This modification of clamping force securement permits shell 24 to move relative to first structural element 50, in accordance to shell 24 expanding or contracting, such that second fastener 54 results in being repositioned within second opening 36 in relationship to opposing sidewalls 38, 40 in FIG. 5b. Second fastener 54 has head 74 which employs a beveled configuration 76 which permits, in particular instances wherein beveled head is permitted to contact shell 24, less surface area engagement between shell 24 and head 74 to facilitate movement of shell 24 with respect to second fastener 54 along second opening 36 permitting relative movement between shell 24 and first structural element 50 with thermal change experienced by shell 24.

In referring to FIG. 4, openings are positioned through shell 24 spaced apart from one another along length L of shell 24. First opening 32 at first portion 34 of shell 24 has a diameter with dimension D and second opening 36 has an elongated shape with a dimension D' which is greater in dimension than dimension D. Third opening 78 defined by shell 24 extends through shell 24 and defines an elongated shape having a third dimension D" which is greater than first dimension D and less than second dimension D', wherein third dimension D" extends along length L of shell 24. Shell 24 defines a pair of internal opposing sidewall portions 80, 82, within third opening 78, spaced apart from one another along length direction L of shell 24. Third opening 78 is positioned spaced apart from and between first opening 32 and second opening 36 along length direction L of shell 24. To accommodate the expansion and contractions of shell 24, there is an increase in dimensions of the openings from dimension D" to dimension D' along shell 24 such that as openings are positioned further away from first opening 32 in first portion 34 of shell 24 the dimension of the openings increase. This increase in opening dimensions, as the openings are positioned further from the first opening 32 position at which shell 24 is anchored, accommodates cumulative expansion and contraction movement of the material of shell 24 that occurs with the material of shell 24 as the material is positioned further from the position in which the material is anchored.

Figure 7:
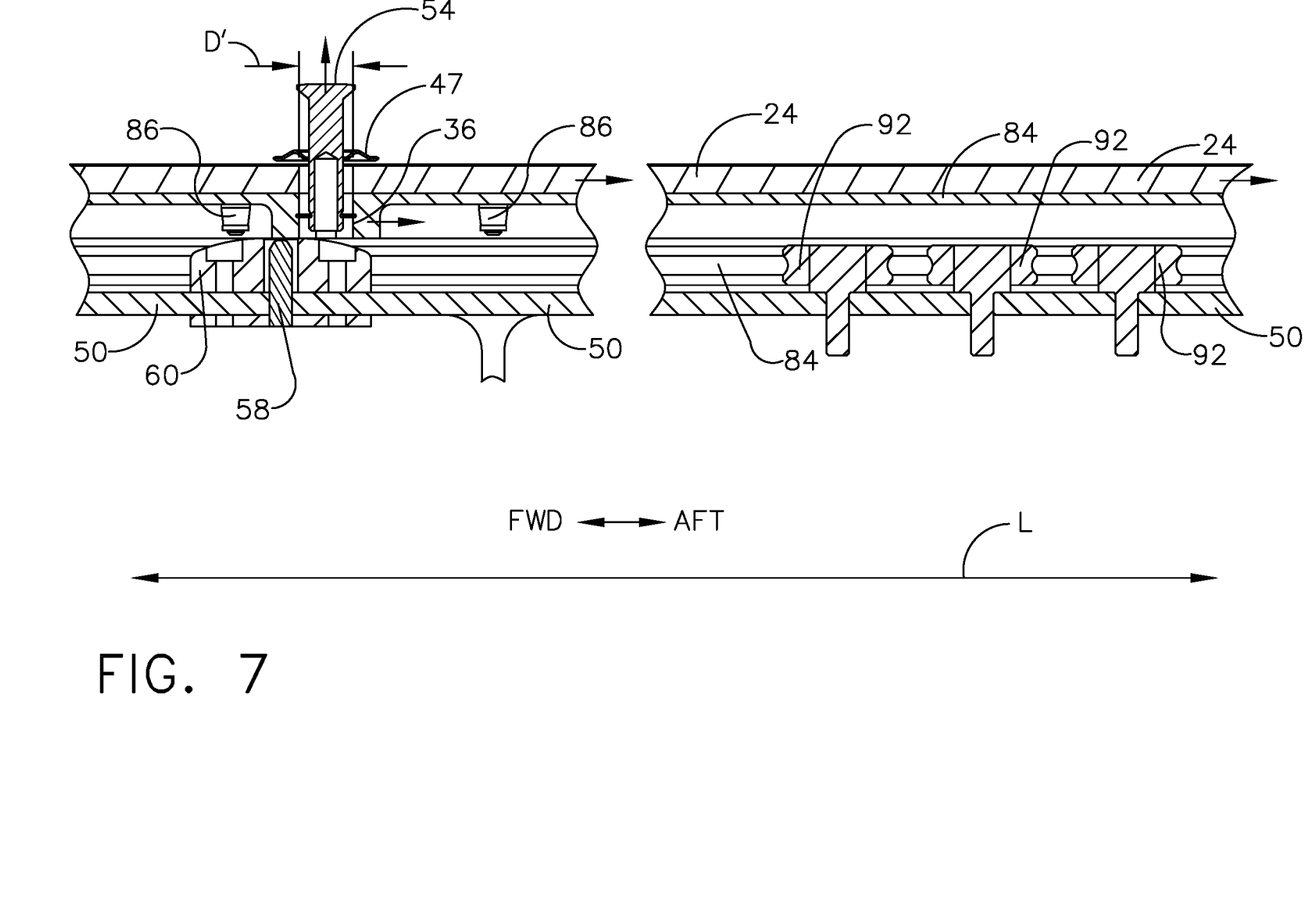
FIG. 7 is a broken partial cross section seen along line 7-7 of FIG. 6 showing a fastener having been disengaged with respect to the aircraft structure permitting the shell to translate relative to the aircraft structure.

In referring to FIGS. 6 and 7, rail 84 is affixed to shell 24 with fasteners 86 and extends along length L of shell 24. Rail 84 in this example is constructed of titanium material which has a very similar thermal coefficient of expansion as that of the composite material of which shell 24 is constructed. Thus with rail 84 affixed to shell 24 and as the thermal conditions change, rail 84 and shell 24 expand and contract in a similar fashion and do not create any significant force loads between fasteners 86 and shell 24. Rail 84 further defines first and second openings 88, 90 as seen in FIGS. 5a and 5b respectively. First opening 88 of rail 84 is aligned with and has the same size and shape as first opening 32 defined by shell 24 and second opening 90 of rail 84 is aligned with and has the same size and shape as second opening 36 defined by shell 24. With rail 84 positioned and secured along length direction L of shell 24, in this example, rotatable wheels 92 associated with and in this example mounted to first structural element 50 engage rail 84.

With the loosening of, for example, second fastener 54, as seen in FIG. 7 as well as other fasteners positioned along length direction L of shell 24, and the at least partial extraction of the fasteners such as second fastener 54 from engagement such as with clamp-up block 60, such removal of the fasteners permit wheels 92 to roll within rail 84 permitting the sliding of radome assembly 14 as seen in FIG. 2 toward the aft end of aircraft 10 providing access to radar system 12. The arrangement described herein with rail 84 secured to shell 24 and wheels 92 mounted to first structural element 50 can also be reversed such that rail 84 is secured to first structural element 50 and wheels 92 are mounted to shell 24.

It should be understood that each opening as seen on side 93 of shell 24 in FIG. 3 has a corresponding similar opening on an opposing side 94 of shell 24 not shown in FIG. 3, such that first, second and third openings 32, 36 and 78 for example are similarly positioned on both side 93 and opposing side 94 of shell 24 and first and second fasteners 42, 54 for example as described herein have a correspondingly similar configuration and location on both side 93 and opposing side 94 of shell 24. Also, rail 84 and wheels 92 arrangement is similarly positioned on both side 93 and opposing side 94 of shell 24 to facilitate rolling of radome assembly 14 in this example toward the aft portion of aircraft 10.

Figure 8:
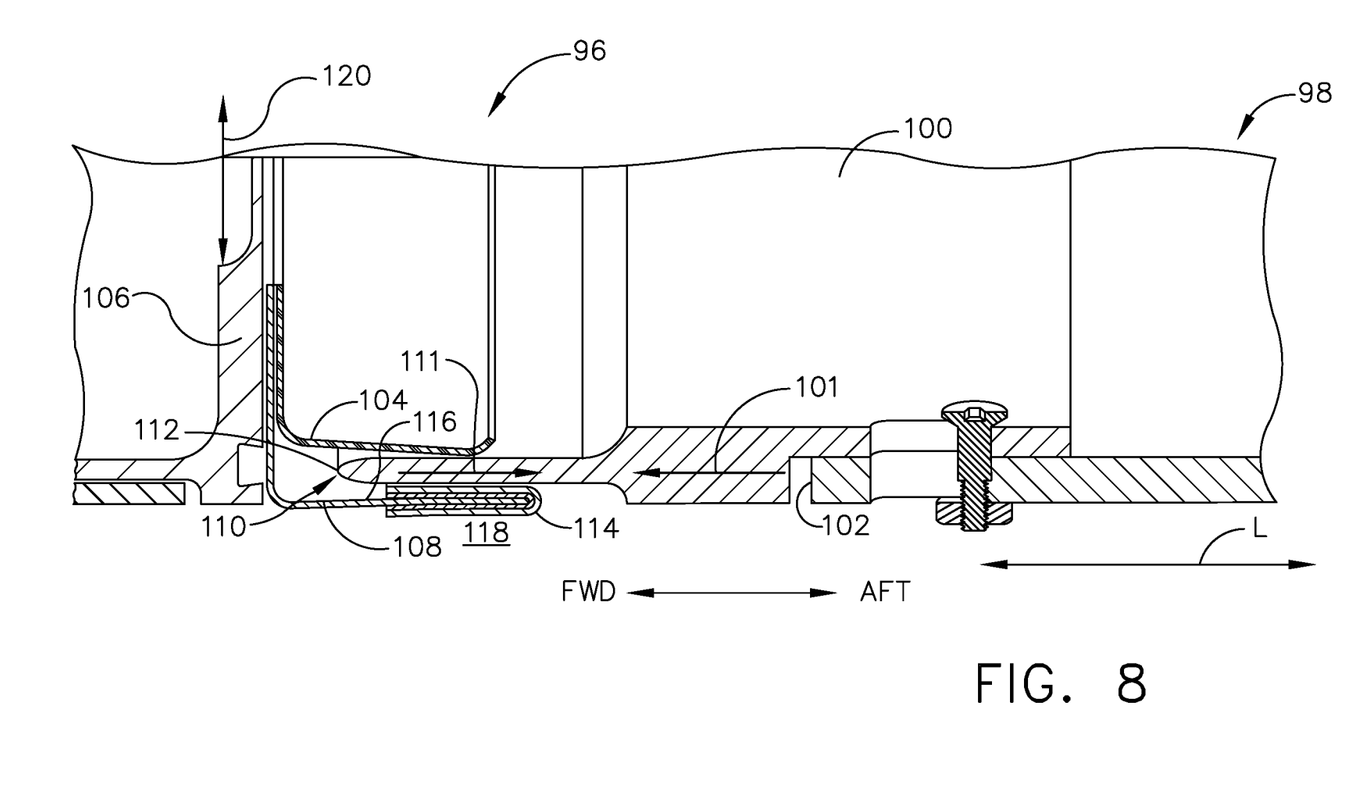
FIG. 8 is a partial cross section perspective view as seen along line 8-8 in FIG. 3 of a forward end portion of the shell having a floating joint connection relative to a forward bulkhead of the radome assembly, wherein the bulkhead is not shown in FIG. 3.

To further permit movement of shell 24 from thermal induced expansion and contraction during operation of aircraft 10 and minimize or eliminate force load buildup, floating engagement 96 as seen in FIG. 8 is employed. Shell 24 has second end portion 98 opposing first end portion 34 of shell 24. Frame member or fitting 100 is secured to second end portion 98 of shell 24 and extends away from distal end 102 of second end portion 98 in direction 101 in which length L of shell 24 extends.

First compression angle 104 is secured to second structural element 106 associated with radome assembly 14. In this example, second structural element 106 is a bulkhead positioned and secured within radome assembly 14 and positioned to extend in direction 120 transverse to length L of shell 24. Second compression angle 108 is also secured to second structural element 106. First and second compression angles 104 and 108 are positioned such that with an object of sufficient thickness to cause first and second compression angles 104 and 108 to separate or otherwise move in a direction away from one another, a compression force is applied to the object, which in this example includes fitting 100.

Frame member or fitting 100 extends between the first and second compression angles 104 and 108 and has sufficient thickness in which to experience a compression force when positioned between first and second compression angles 104 and 108. With frame member 100 positioned between first and second compression angles 104 and 108 slot 110 is defined between first and second compression angles 104 and 108. Slot 110 extends away from distal end 112 of frame member 100 and shell 24 in direction 101 in which length L of shell 24 extends and in opposing direction 111 to direction 101 permitting frame member 100 to travel within slot 110 in one of direction 101 with expansion of shell 24 or in opposing direction 111 with contraction of shell 24 along length L of shell 24. In a second embodiment of radome assembly 14 of aircraft 10, shell 24 having an elongated shape, as described earlier. As seen in FIG. 3, shell 24 has first end portion 34 of shell 24 fixedly connected on opposing sides 93 and 94 of shell 24 to first structural element 50, as seen for example in FIG. 5a, which is connected to aircraft 10. Second end portion 98 of shell 24, opposing first end portion 34, as seen in FIGS. 3 and 8, of shell 24 is fixedly secured to a frame member 100 which extends away from distal end 102 of shell 24 in direction 101 in which length L of shell 24 extends. In referring to FIG. 8, first compression angle 104 secured to second structural element 106 associated with radome assembly 14, as described earlier. Second compression angle 108 is also secured to second structural element 106. Frame member 100 extends between first and second compression angles 104 and 108.

With frame member 100 positioned between first and second compression angles 104 and 108, slot 110 defined between first and second compression angles 104 and 108 extends away from distal end 112 of frame member 100 in direction 101 in which length L of shell 24 extends and extends away from distal end 112 of frame member 100 toward shell 24 in opposing direction 111 permitting frame member 100 to travel within slot 110 in one of direction 101 with expansion of shell 24 along length L of shell 24 or in opposing direction with contraction of shell 24 along length L of shell 24. With shell 24 affixed at first end portion 34 of shell 24 and second end portion 98 secured to frame member 100 which is permitted to move within slot 110 formed by first and second compression angles 104 and 108, changes in temperature experienced by the material of shell 24 will cause the material to expand or contract and move within slot 110 without permitting shell 24 to experience high loads and deform.

As earlier discussed, shell 24 defines internal volume 26 and length L of shell 24 extends in the direction of a length L' of aircraft 10. As has been described earlier, further movement of shell 24 is permitted with controlled compression engagement between shell 24 and first structural element 50 along length L of shell 24. At first end portion 34 of shell 24, shell 24 is secured firmly to first structural element 50. As seen in FIG. 5a, shell 24 is fixedly secured to first structural element 50 with shell 24 wherein shell 24 defines first opening 32 which extends through shell 24 positioned within first end portion 34 of shell 24 having a diameter of first dimension D. First fastener 42 extends through first opening 32 and is engaged with first surface 44 associated with first structural element 50 which is connected to aircraft 10, as described earlier herein. As also described earlier, in this example, first structural element 50 extends along length L of shell 24. First fastener 42 resists movement of shell 24 and first structural element 50 relative to one another wherein first fastener 42 is engaged to first surface 44. This engagement includes, in this example, first surface 44 defining threads (not shown) which are configured to engage threads (not shown) defined by first fastener 42 and the threads of first fastener 42 engage the threads of first surface 44, as described earlier.

Shell 24 defines second opening 36, as seen in FIG. 5b, which extends through shell 24 and defines an elongated shape having second dimension D' which extends along length L of shell 24 wherein second dimension D' is greater than first dimension D. Shell 24 defines a pair of internal opposing sidewall portions 38 and 40, within second opening 36, spaced apart from one another along length L of shell 24. Second opening 36 is positioned spaced apart from first opening 32 along length L of shell 24.

Second fastener 54 extends through second opening 36 and is positioned between the pair of second internal opposing sidewall portions 38 and 40 within second opening 36. Second fastener 54 is engaged with second surface 56 associated with first structural element 50, as described earlier, such that shell 24 is moveable in a direction along length L of shell 24 relative to first structural element 50 as a result of thermal induced expansion or contraction of shell 24. Second fastener 54 is engaged to second surface 56 with second surface defining threads (not shown) which are configured to engage threads (not shown) defined by second fastener 54 and the threads of second fastener 54 engage the threads of second surface 56. The engagement of second fastener 54 with second surface 56 applies a compressive force between shell 24 and first structural element 50, as earlier described, wherein the compressive force is controlled such that shell 24 and first structural element 50 are secured to one another but shell 24 is permitted to move relative to first structural element 50 along a length L of shell 24 with second fastener 54 as a result being repositioned within second opening 36 as a result of thermal contraction or expansion of shell 24.

Additional openings are provided spaced apart along length L of shell 24 which includes a similar engagement as provided by second fastener 54. In this example, the openings as they are positioned more distal from first opening 36, the openings are elongated and have a greater dimension along length L of shell 24 than those openings positioned closer to first opening 36. This increase in dimension of the openings provide for accumulated dimension change along shell 24 such that the openings positioned further from first opening 32 can permit the fastener to move to a greater extent based on thermal contraction or expansion of shell 24. For example, third opening 78, as seen in FIG. 3, defined by shell 24 extends through shell 24 and defines an elongated shape having third dimension D" which is greater than first dimension D and less than second dimension D'. Third dimension D" extends along length L of shell 24 and shell 24 defines a pair of internal opposing sidewall portions 80 and 82, within third opening 78, spaced apart from one another along length L of shell 24. Third opening 78 is positioned spaced apart from and between first opening 32 and second opening 36 along length L of shell 24.

In referring to FIG. 8, elastic fabric sheet 114 is positioned to overlie inside surface 116 of second compressive angle 108 and is positioned between frame member 100 and the second compressive angle 108. Elastic fabric sheet 114 is compressed between second compressive angle 108 and frame member 100 and provides a moisture seal between an internal portion of radome assembly 14 and an external atmosphere 118 of aircraft 10 protecting radar system 12 from unwanted moisture exposure.

As mentioned earlier second structural element 106, as seen in FIG. 8, is, in this example, second structural element or bulkhead 106 is part of the structure of radome assembly 14, is in a fixed position within radome assembly 14 and extends in direction 120 transverse to length L of shell 24. Second structural element or bulkhead 106 provides support for first and second compressive angles 104 and 108. First and second compressive angles 104, 108 permit the movement of shell 24 as shell 24 is exposed to changing temperatures and facilitates sustaining a continuity of shape of shell 24 as shell 24 extends across radome assembly 14.

While various embodiments have been described above, this disclosure is not intended to be limited thereto. Variations can be made to the disclosed embodiments that are still within the scope of the appended claims.

What is claimed:

1. A radome assembly of an aircraft, comprising:
 a shell having an elongated shape, wherein:
   the shell defines a first opening which extends through the shell having a diameter of a first dimension and is positioned within a first end portion of the shell; and
   the shell defines a second opening which extends through the shell having an elongated shape which extends along a length of the shell, has a second dimension which is greater than the first dimension and is spaced apart along the length of the shell from the first opening; and
   the shell defines a third opening which extends through the shell having an elongated shape which has a third dimension which extends along the length of the shell, the third dimension is greater than the first dimension and less than the second dimension and the third opening is positioned spaced apart from and between the first opening and the second opening along the length of the shell; and a first fastener extends through the first opening and is engaged with a first surface associated with a first structural element connected to the aircraft and the first fastener resists movement of the shell and the first structural element relative to one another; and a second fastener extends through the second opening and is engaged with a second surface associated with the first structural element such that the shell is moveable along the length of the shell relative to the first structural element as a result of thermal induced expansion or contraction of the shell.

2. The radome assembly of claim 1, wherein the shell defines an internal volume and the length of the shell extends along a length of the aircraft.

3. The radome assembly of claim 1, wherein the first fastener is engaged with the first surface with the first surface defining threads which are configured to engage threads defined by the first fastener and the threads of the first fastener engage the threads of the first surface.

4. The radome assembly of claim 1, further including:
a rail affixed to the shell which extends along the length of the shell and defines a first and second openings aligned with and having a same size and shape of the first and second openings of the shell respectively; and
a rotatable wheel associated with the first structural element engages the rail.

5. The radome assembly of claim 1, wherein the second fastener is engaged with the second surface with the second surface defining threads which are configured to engage threads defined by the second fastener and the threads of the second fastener engage the threads of the second surface.

6. The radome assembly of claim 1, wherein the shell defines a pair of internal opposing sidewall portions, within the second opening, which are positioned spaced apart from one another along the length of the shell.

7. The radome assembly of claim 1, wherein
the shell defines a pair of internal opposing sidewall portions, within the third opening, spaced apart from one another along the length of the shell.

8. The radome assembly of claim 1, further including the shell having a second end portion opposing the first end portion of the shell wherein a frame member is secured to the second end portion and extends away from a distal end of the second end portion in a direction in which the length of the shell extends.

9. The radome assembly of claim 8, further including:
a first compression angle secured to a second structural element associated with the radome assembly; and
a second compression angle secured to the second structural element.

10. The radome assembly of claim 9, wherein:
the frame member extends between the first and second compression angles; and
with the frame member positioned between the first and second compression angles, a slot defined between the first and second compression angles extends away from a distal end of the frame member in an opposing direction to the direction, permitting the frame member to travel within the slot in one of the direction with expansion of the shell along the length of the shell or in the opposing direction with contraction of the shell along the length of the shell.

11. A radome assembly of an aircraft, comprising:
a shell having an elongated shape; wherein:
a first end portion of the shell is fixedly connected to a first structural element connected to the aircraft;
a second end portion of the shell opposing the first end portion of the shell is fixedly secured to a frame member, which extends away from a distal end of the shell in a direction in which a length of the shell extends;
a first compression angle secured to a fixed structural element associated with the radome assembly;
a second compression angle secured to the fixed structural element, wherein:
the frame member extends between the first and second compression angles; and
with the frame member positioned between the first and second compression angles, the first compression angle and the second compression angle exert a compression force on the frame member and a slot defined between the first and second compression angles extends away from a distal end of the frame member in the direction in which the length of the shell extends and extends away from the distal end in an opposing direction to the direction permitting the frame member to travel within the slot in one of the direction with expansion of the shell along the length of the shell or in the opposing direction with contraction of the shell along the length of the shell.

12. The radome assembly of claim 11, wherein the shell defines an internal volume and the length of the shell extends along a length of the aircraft.

13. The radome assembly of claim 11, further including an elastic fabric sheet positioned to overlie an inside surface of the second compressive angle and is positioned between the frame member and the second compressive angle.

14. The radome assembly of claim 11, wherein the fixed structural element comprises a bulkhead which extends in a direction transverse to the length of the shell.

15. The radome assembly of claim 11, wherein the shell, fixedly secured to the first structural element, includes the shell defining a first opening, which extends through the shell, has a diameter of a first dimension and is positioned within the first end portion of the shell.

16. The radome assembly of claim 15, further including the shell defines a second opening, which extends through the shell and has an elongated shape having a second dimension and which extends along the length of the shell wherein the second dimension is greater than the first dimension.

17. The radome assembly of claim 16, wherein:
the shell defines a pair of internal opposing sidewall portions, within the second opening, spaced apart from one another along the length of the shell; and
the second opening is positioned spaced apart along the length of the shell from the first opening.

18. The radome assembly of claim 17, further including a third opening defined by the shell, wherein:
the third opening extends through the shell having an elongated shape which has a third dimension which extends along the length of the shell;
the third dimension is greater than the first dimension and less than the second dimension;
the third dimension extends along the length of the shell;
the third opening is positioned spaced apart from and between the first opening and the second opening along the length of the shell; and the shell defines a pair of internal opposing sidewall portions, within the third opening, spaced apart from one another along the length of the shell.

19. The radome assembly of claim 17, further includes:
a first fastener extends through the first opening and is engaged with a first surface associated with the first structural element, wherein:
   the first structural element extends along the length of the shell; and
   the first fastener resists movement of the shell relative to the first structural element; and
a second fastener extends through the second opening, wherein:
   the second fastener is positioned between the pair of internal opposing sidewall portions; and
   the second fastener is engaged with a second surface associated with the first structural element such that the shell is moveable along the length of the shell relative to the first structural element as a result of thermal induced expansion or contraction of the shell.

20. The radome assembly of claim 19, wherein:
the first fastener is engaged with the first surface with the first surface defining threads which are configured to engage threads defined by the first fastener and the threads of the first fastener engage the threads of the first surface; and
the second fastener is engaged with the second surface with the second surface defining threads which are configured to engage threads defined by the second fastener and the threads of the second fastener engage the threads of the second surface.

\* \* \* \* \*

UNITED STATES PATENT AND TRADEMARK OFFICE
CERTIFICATE OF CORRECTION

PATENT NO. : 10,978,792 B2
APPLICATION NO. : 15/730082
DATED : April 13, 2021
INVENTOR(S) : Harleman et al.

Page 1 of 1

It is certified that error appears in the above-identified patent and that said Letters Patent is hereby corrected as shown below:

In the Claims

At Column 11, Lines 21-22, "with the first surface with the first surface" should be -- with the first surface --.

At Column 11, Lines 33-34, "with the second surface with the second surface" should be -- with the second surface --.

At Column 12, Line 2, "shape;" should be -- shape, --.

At Column 13, Lines 23-24, "with the first surface with the first surface" should be -- with the first surface --.

At Column 13, Lines 28-29, "with the second surface with the second surface" should be -- with the second surface --.

Signed and Sealed this
Third Day of August, 2021

Drew Hirshfeld
*Performing the Functions and Duties of the
Under Secretary of Commerce for Intellectual Property and
Director of the United States Patent and Trademark Office*